United States Patent

Naccarato et al.

[11] Patent Number: 5,871,058
[45] Date of Patent: Feb. 16, 1999

[54] LEVER ACTION YARD AND GARDEN IMPLEMENT

[75] Inventors: Robert Naccarato, Salt Lake City; Bradley Olsen, Ivins, both of Utah

[73] Assignee: Leverage Digger Incorporated, Midvale, Utah

[21] Appl. No.: 835,942

[22] Filed: Apr. 11, 1997

Related U.S. Application Data

[63] Continuation-in-part of Ser. No. 63,753, Dec. 16, 1996.

[51] Int. Cl.$^6$ .......................................... A01B 1/00
[52] U.S. Cl. ......................... 172/378; 172/371; 294/55.5
[58] Field of Search ..................................... 172/371, 378, 172/380; 294/49, 55.5, 57, 50, 50.5; 56/400.04, 400.06, 400.07, 400.21

[56] References Cited

U.S. PATENT DOCUMENTS

| | | | |
|---|---|---|---|
| 212,953 | 3/1879 | Kreider | 294/49 |
| 460,157 | 9/1891 | Osborne | 172/378 |
| 567,391 | 9/1896 | Hopper . | |
| 821,847 | 5/1906 | Arnavat | 294/49 X |
| 943,325 | 12/1909 | Stewart . | |
| 1,037,734 | 9/1912 | De Haven . | |
| 1,194,197 | 8/1916 | Jones . | |
| 1,521,086 | 12/1924 | Fegebank . | |
| 1,556,480 | 10/1925 | Bodine . | |
| 1,857,500 | 5/1932 | Davison | 294/55.5 X |
| 1,973,310 | 9/1934 | Glasier . | |
| 2,181,189 | 11/1939 | Lathan . | |
| 2,207,741 | 7/1940 | Kimble | 111/99 |
| 2,373,898 | 4/1945 | Kulesh | 172/378 X |
| 2,716,538 | 8/1955 | Arrowood | 294/49 |
| 3,226,149 | 12/1965 | McJohnson | 294/57 X |
| 3,434,753 | 3/1969 | De Croes | 294/55.5 X |
| 3,767,251 | 10/1973 | San Filipo | 172/378 X |
| 3,858,814 | 1/1975 | Wagner, Jr. . | |
| 4,461,458 | 7/1984 | Poulin . | |
| 4,815,778 | 3/1989 | Hoch . | |
| 5,033,782 | 7/1991 | Hirzel . | |
| 5,060,343 | 10/1991 | Nisenbaum . | |
| 5,120,098 | 6/1992 | Childress | 294/57 X |
| 5,360,071 | 11/1994 | Bergendorf . | |
| 5,496,015 | 3/1996 | Carmien | 294/57 X |

FOREIGN PATENT DOCUMENTS

| | | | |
|---|---|---|---|
| 2631511 | 11/1989 | France | 172/378 |
| 459918 | 1/1937 | United Kingdom | 172/378 |
| 2216375 | 10/1989 | United Kingdom | 172/378 |

Primary Examiner—Thomas B. Will
Assistant Examiner—Victor Batson
Attorney, Agent, or Firm—Thorpe, North & Western, L.L.P.

[57] ABSTRACT

An apparatus for manually moving, turning, and loosening earth and soil and which is particularly adapted for turning and loosening soil in a garden. An interchangeable implement head, preferably a fork, is configured for penetrating the earth. The implement head is connected to a shaft which supports a handle. The shaft includes upper and lower segments with the upper segment being angled away from the user's body. Positioned adjacent to the implement head, and connected to the shaft, is a structure for receiving the foot of the user. The structure for receiving the foot of the user preferably surrounds the circumference of the foot and loosely holds the foot in position to allow the user to push downwardly with the foot so that the implement head penetrates the earth. A lever arm adapted for extending the fulcrum point for the implement away from the back side of the implement head provides the user additional mechanical advantage. The lever arm is oriented at a downward lever angle so that as the user pulls the handle toward the user's torso, the lever arm contacts the surface of the earth and causes the implement head to move soil in forward and upward directions.

19 Claims, 4 Drawing Sheets

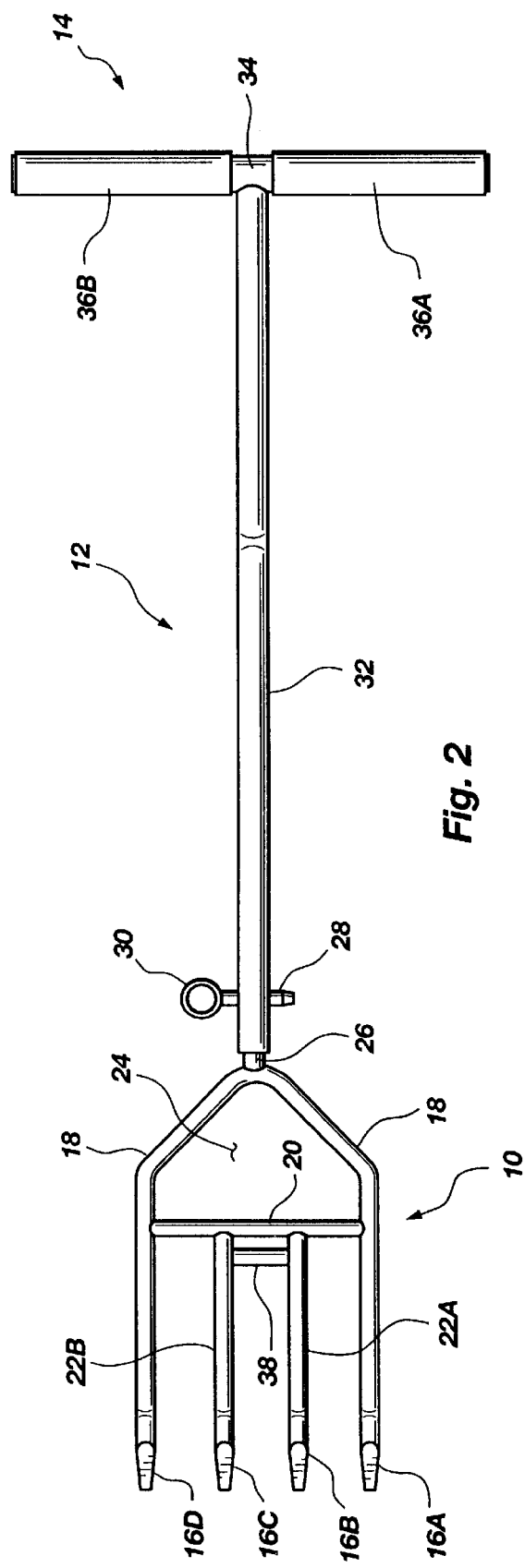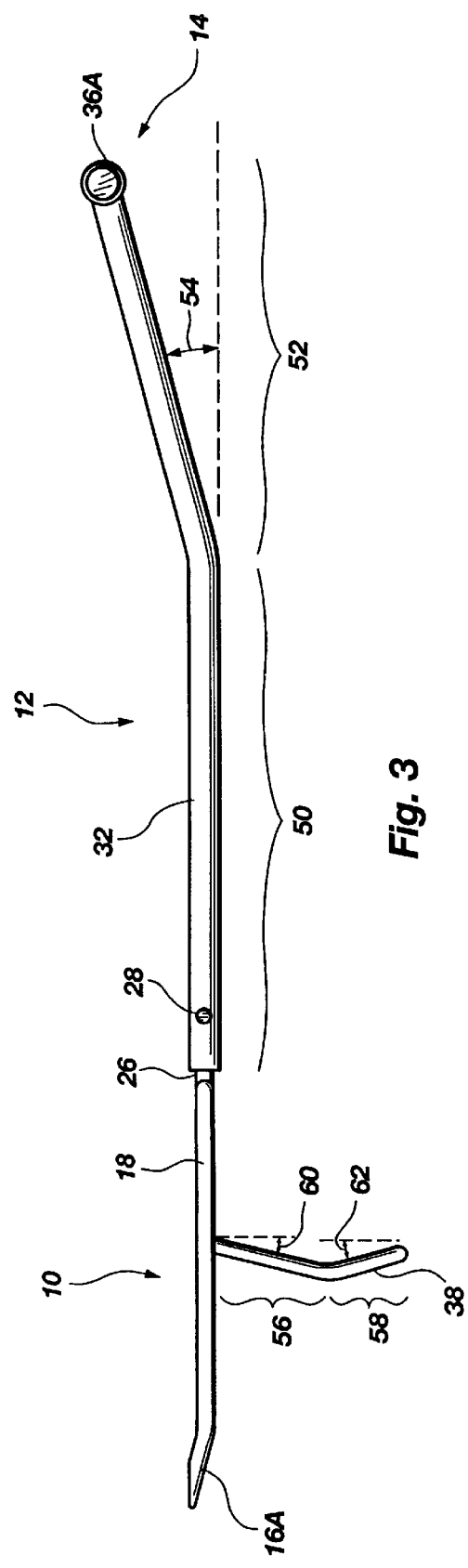

LEVER ACTION YARD AND GARDEN IMPLEMENT

RELATED APPLICATIONS

This application is a continuation-in-part of U.S. patent application Ser. No. 29/063,753 filed Dec. 16, 1996 entitled Lever Action Cultivator.

BACKGROUND

1. The Field of the Invention

This invention relates to gardening implements. More particularly, the present invention is related to digging tools used to manually move earth in a garden.

2. The Background Art

Gardening is a very popular hobby, avocation, and to some persons business. In the United States alone over seventy two million households participated in one or more types of garden activities. For some gardeners, the cultivation of flowers is a serious activity. For others, tending a household vegetable garden provides fresh vegetables for the household diet. Many persons derive great satisfaction from a number of different gardening activities.

The vast majority of such household gardens are so small that the expense and bother of powered mechanized soil preparation devices is not justified. For this vast majority of household gardens, tools which are manually operated by the user are the only tools which are used. Common examples of such tools are devices known as shovels, hoes, claws, cultivators, rakes, and forks.

It is widely appreciated by gardeners that turning or loosening of the soil in which seeds are planted, and in which the resulting plants grow, results in a more productive garden. Unfortunately, moving earth in a garden can be an exhausting activity for even the most enthusiastic gardener. A variety of different devices have been proposed to make the task of turning or loosening soil easier.

In view of the foregoing, it would be an advance in the art to provide a garden implement which makes the task of moving, turning and/or loosening garden soil easier.

BRIEF SUMMARY AND OBJECTS OF THE INVENTION

In view of the above described state of the art, the present invention seeks to realize the following objects and advantages.

It is a primary object of the present invention to provide a garden implement which makes turning and loosening of soil easy for a user.

It is another object of the present invention to provide a garden implement which readily allows a user to loosen and/or turn compacted soil.

It is also an object of the present invention to provide an implement which allows a user to move compacted earth without excessive physical exertion.

It is a further object of the present invention to provide a garden implement which allows a gardener to loosen and turn compacted soil without undue strain on the gardener's back.

It is another object of the present invention to provide a manually operated implement which assist a user when moving earth.

These and other objects and advantages of the invention will become more fully apparent from the description and claims which follow, or may be learned by the practice of the invention.

The present invention provides an apparatus for manually moving earth which is particularly adapted for turning and loosening soil in a garden. The preferred embodiments of the present invention include a head means, or implement head, for penetrating the earth and for providing a surface by which earth and soil can be pushed in a desired direction. In one preferred form, the head means can include a plurality of tines so that a fork is formed which is particularly configured to turn and loosen soil. Optionally, other implement heads are interchangeable with the fork head.

The implement head is connected to a shaft means, also referred to as a shaft, which supports a handle. The shaft preferably includes upper and lower segments, the upper segment being angled away from the user's body to facilitate the user operating the apparatus. The handle provides a convenient location for the user to grasp and pull on the shaft.

In one preferred embodiment of the present invention, positioned adjacent to the implement head, and connected to the shaft, is a means for receiving the foot of the user. The means for receiving the foot of the user preferably surrounds the circumference of the foot and loosely holds the foot in position to allow the user to push downwardly with the foot so that the implement head penetrates the earth. The angling of the upper segment of the shaft means away from the torso of the user allows the user to efficiently position the foot on the means for receiving the foot and to efficiently apply weight to the implement head. After the implement head has penetrated the earth, the user is able to pull the shaft toward the user's torso more easily in view of the upper segment of the shaft being angled away from the user when the implement head is driven into the soil.

Most advantageously, the embodiments of the present invention include a lever means, or lever arm, for extending the fulcrum point for the implement head away from the back side of the implement head. The lever arm preferably is oriented at a downward lever angle so that as the user pulls the handle toward the user's torso, the lever arm contacts the surface of the earth and causes the implement head to move soil in a forward and upward direction. In some embodiments of the present invention the most distal portion of the lever arm is provided with a segment which is angled upward to provide more efficient moving of the soil.

BRIEF DESCRIPTION OF THE DRAWINGS

In order to better appreciate how the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which:

FIG. 2 is a front view of the embodiment of the present invention which is represented in FIG. 1.

FIG. 3 is a side view of the embodiment of the present invention which is represented in FIG. 1.

DETAILED DESCRIPTION OF THE PREFERRED EMBODIMENTS

Reference will now be made to the drawings wherein like structures will be provided with like reference designations.

Figure 1:
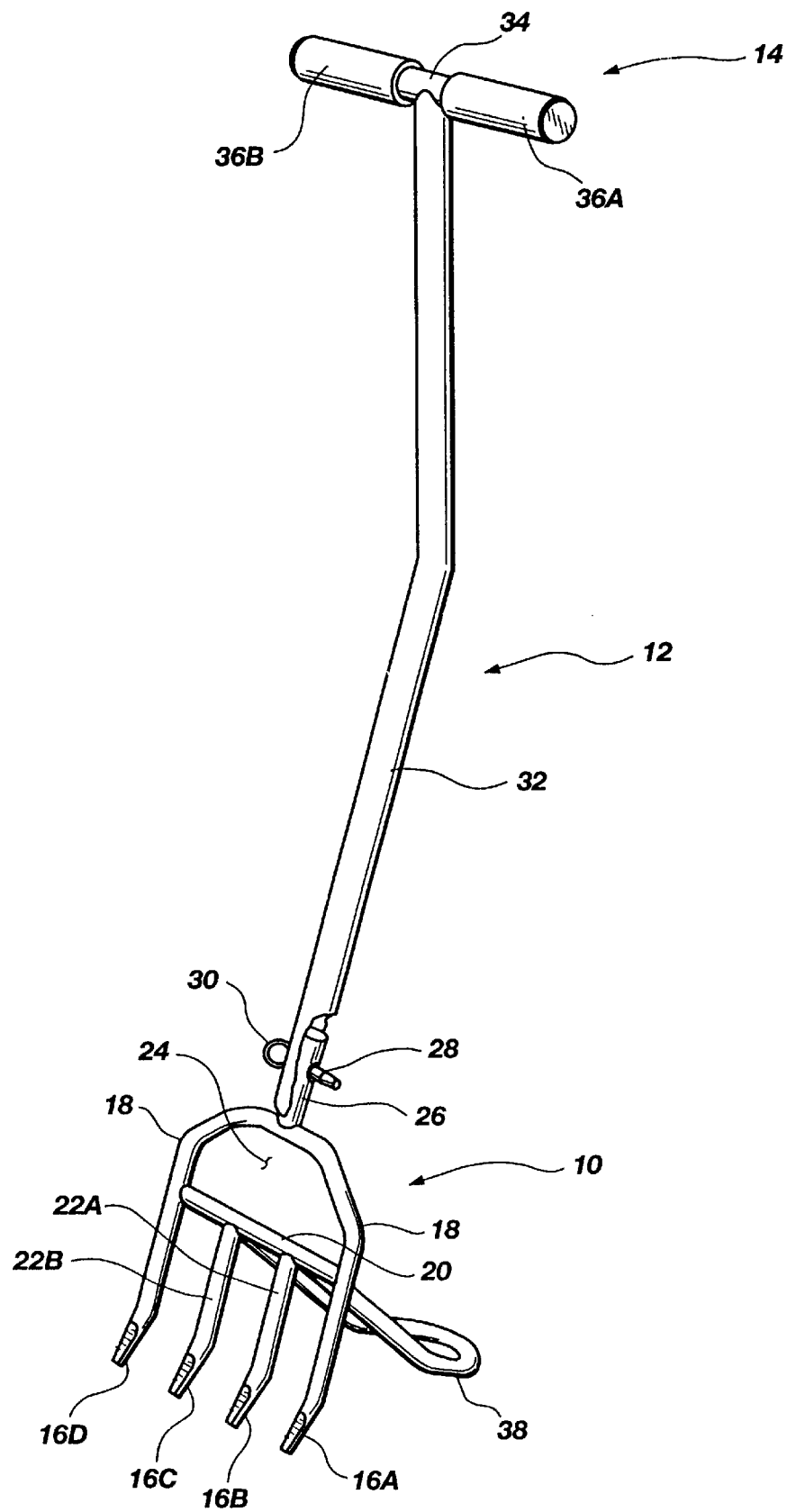
FIG. 1 is a perspective view of the presently preferred embodiment of the present invention.

Reference will first be collectively made to FIGS. 1, 2, and 3 which are perspective, front, and side views of one presently preferred embodiment of the present invention. The particular embodiment represented in FIGS. 1–3 will be referred to herein as an implement but may also be referred to by those skilled in the art by many different names, for example, cultivator, fork, claw, or shovel.

The implement represented in FIGS. 1–3 includes a head portion, generally represented at 10, a shaft portion, generally represented at 12, and a handle portion, generally represented at 14. As will be explained in more detail shortly, the head portion 10 in the illustrated embodiment may be interchanged for other head portions (see FIGS. 5A–B). It will be appreciated that the head portion 10 is that portion of the implement which is intended to penetrate the earth making possible the task of moving earth, and in the particular case of the implement represented in FIGS. 1–3, performs the function of turning and loosening soil which is desirable to prepare and maintain a garden. Further information regarding the head portion 10 will be provided shortly.

The shaft portion 12 preferably includes a tubular steel pole 32. It is within the scope of the present invention to fabricate the shaft portion 12 from many different materials, as known to those skilled in the industry. For example, the shaft portion 12 can be fabricated from non-metallic materials as well as from a variety of metallic materials. The shaft portion 12 can also be fabricated so that it is hollow or solid, and cylindrical or some other cross sectional shape.

Positioned at the distal end of the shaft portion 12 is the handle portion 14. In the preferred embodiment represented in FIGS. 1–3, the handle portion comprises a tubular steel segment 34 which is attached to the distal end of the tubular steel pole 32 so that the tubular steel segment 34 is preferably oriented perpendicularly to the pole 32.

It is to be appreciated that the handle portion 14 can be fabricated from many different materials and formed in many different shapes. For example, many different structures can function as a handle means for providing a location for a user to grasp. The handle means may include a portion of the pole 32 which has been designated as a location where the user can grasp. In such a case, the cushions 36A&B provided on the tubular steel segment 34 can be applied directly to the distal end of the pole 32. Thus the handle means of the present invention also includes within its scope a location provided on the pole 32, or alternatively, one or more structures (such as the tubular steel segment 34) can used in with, or in place of, merely designating a portion of the pole 32 as a handle means.

Reference will next be specifically made to FIG. 3 to show the orientation of the shaft portion 12. One of the drawbacks of many previously available devices is that when the user wishes to move the earth, the shaft and handle of the implement interferes with the user's movement. The present invention allows the user to efficiently use the mechanics of the human body by orienting the distal end of the shaft portion 12 away from the user's body. As shown in FIG. 3, the proximal segment of the pole 32, designated by bracket 50, is coplanar with the head portion 10. Advantageously, the proximal segment of the pole 32, designated by bracket 52, is angled toward the front side of the head portion 10. The angle of orientation, represented at 54, of the distal segment 52 of the pole 32 is preferably in the range from about 0° to about 50°, more preferably in the range from about 5° to about 45°, and most preferably in the range from about 5° to about 40°. Angling the distal segment 52 of the pole 32 away from the user's body greatly assists the user to efficiently use the embodiment represented in FIGS. 1–3 as will be further explained shortly.

Still referring to FIGS. 1–3, the head portion 10 will be further described. The head portion 10 is optionally interchangeable with other similar structures as will be described in connection with FIGS. 5A–B. As can be seen best in the cutaway portion of FIG. 1, the head portion 10 includes a post 26 which is received into the tubular steel pole 32. The post 26 and the tubular steel pole 32 include bores there through and through which a pin 28, with an eye 30, is inserted to function as one example as of a means for securing the implement head in place. Those skilled in the art will readily appreciate the many different structures available in the art to securely hold the implement head in place and to hold the pin 28 in place. Moreover, it is within the scope of the present invention to permanently attach the head portion 10 to the remainder of the implement or to form the head portion 10 integrally with the remainder of the implement.

As will be appreciated by the views provided in FIGS. 1–3, one preferred head portion 10 of the present invention is configured as a fork. The fork is preferably formed using a single outside tine member 18 which is formed in a generally inverted U shape and which includes the post 26 at its apex. The ends 16A and 16D of the outside tine member 18 are preferably provided with a slight bend toward the front side of the head portion 10 and are provided with a sharpened tip. It is preferred that the head portion 10 illustrated in FIGS. 1–3 is fabricated from rounded steel rod which is bent and welded but many different materials and fabrication techniques can be used within the scope of the present invention.

It will be appreciated that the head portion 10 illustrated in FIGS. 1–3 is particularly adapted to turn and loosen soil. The implement represented in FIGS. 1–3 is particulary efficient for turning and loosening even compacted soil.

Connected between the legs of the outside tine member 18 is a cross member 20. The cross member 20 strengthens the head portion 10 and performs other functions as will now be explained. Attached to the cross member 20 are fork tines 22A and 22B. Ends 16B and 16C of the tines 22A and 22B are each provided with a slight bend toward the front side of the head portion 10 and are provided with a sharpened tip, similarly to the configuration of ends 16A and 16D of the outside tine member 18.

The cross member 20 functions as a foot rest and, in cooperation with the outside tine member 18, forms a foot receiver structure, designated at 24, which is one preferred example of a means for receiving the foot of the user. It will be appreciated that many different structures can perform the function of a means for receiving the foot of the user. The illustrated foot receiver structure 24 is preferred because it provides a convenient location for the user to place a sole of the user's foot as the user applies pressure to the head portion 10. Moreover, the illustrated foot receiver structure 24 surrounds the circumference of the user's foot and thus prevents the user's foot from slipping off from the cross member 20 during use. Providing structures which guide the foot into position and which also hold the foot of the user in position on the cross member 20 provides greater safety and convenience for the user.

In order to provide even greater efficiency of operation for the user, a lever arm 38 is provided on the head portion 10. The lever arm 38 is the presently preferred example of a lever means for extending the fulcrum point of the head portion 10. The lever arm 38 extends the fulcrum point away from the back side of the head portion 10 from where it would otherwise be without the provision of the lever arm 38. Advantageously, the lever arm 38 provides the user much greater mechanical advantage than previously available with other devices. The lever arm 38 can be fabricated in many different forms from that illustrated in the figures, all of which perform equivalent functions as the lever arm and all of such different forms are intended to fall within the scope of the lever means of the claimed invention.

The lever arm 38 is preferably fabricated from steel rod welded to the cross member 20 but the lever arm 38 can be fabricated from many different materials, and fabricated using many different techniques, all of which are known in the art.

For example, the lever arm 38 can also be configured as multiple finger-like protrusions or a single unitary structure which perform a function equivalent to that provided by the lever arm 38. It will be appreciated that some users will find it advantageous to use the lever arm 38 as an additional location to receive the foot of the user.

As can be seen best in the side view of FIG. 3, it is preferred that the lever arm 38 extend from the back side of the head portion 10. Thus, the lever arm 38 extends in the direction of the user when the implement is used in the preferred fashion as will be explained shortly. Advantageously, the lever arm 38 preferably extends at an angle from the plane which is formed by the tine member 18. Orienting the lever arm 38 at an angle provides that the user can most efficiently operate the implement. It is preferred that a first segment of the lever arm 38 (indicated by bracket 56) is oriented at a first angle (represented at 60) while a second segment of the lever arm 38 (indicated by bracket 58) is oriented at a second angle (indicated at 62) in relation to the plane formed by the tine member 18.

It is preferred that the angle 60 be in the range from about 0° to about 50°, more preferably in the range from about 5° to about 45°, and most preferably in the range from about to about 40°. Similarly, it is preferred that the angle 62 be in the range from about 5° to about 50°, more preferably in the range from about 5° to about 45°, and most preferably in the range from about 5° to about 40°. The preferred first lever angle 60 allows the user to exert more mechanical advantage on the earth which is being pushed by the tines of the head portion 10 and thus provides advantage for the user. The preferred second lever angle 62 allows the user to exert even more mechanical advantage on the soil which is being pushed away after the user begins to move the soil. Those skilled in the art will appreciate that some embodiments of the present invention also may include a lever arm 38, or the equivalent thereof, which includes only angle 60 or angle 62 and that it is within the scope of the present invention to set both angles so that the lever arm 38 is substantially perpendicular to the plane formed by the tine member 18 or at some angle other than those specified herein.

Figure 4A:
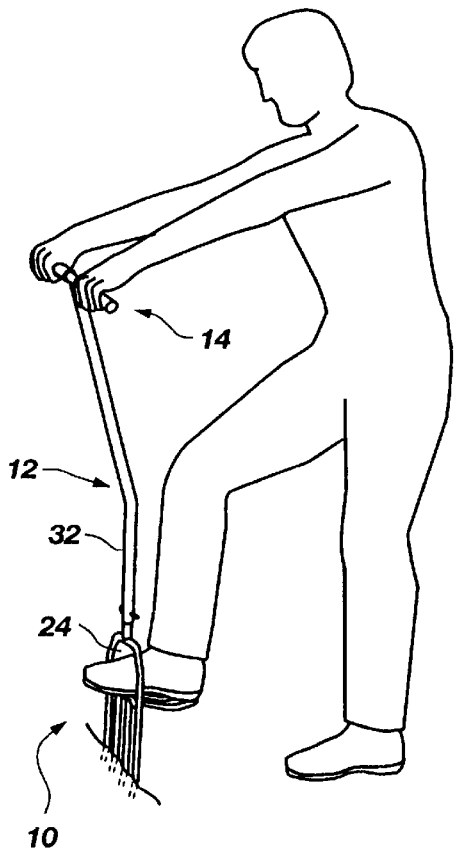
FIGS. 4A–C are perspective views representing one preferred method for using the present invention.
Figure 4B:
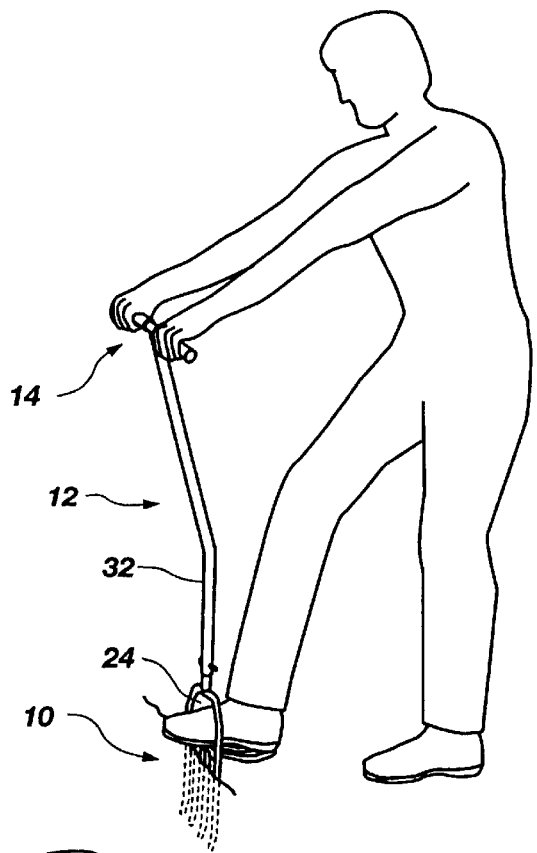
Figure 4C:
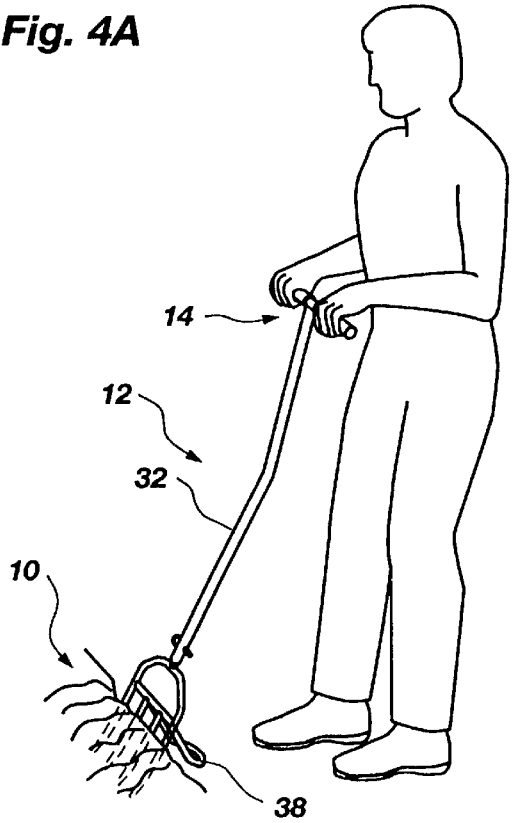

Reference will now be made to FIGS. 4A, 4B, and 4C to explain the preferred method for using the present invention. FIG. 4A shows the foot of the user being placed in the foot receiver structure 24 with the proximal segment 50 (FIG. 3) of the pole 32 being oriented in a substantially vertical direction or being substantially perpendicular to the surface of the earth. As illustrated in FIG. 4A, the foot of the user is applied to the cross member 20 and the distal segment 52 (see FIG. 3) of the pole 32 is angled away from the torso of the user with the user grasping the handle portion 14 or directly grasping the most distal portion of the pole 32.

FIG. 4B shows the user having applied sufficient pressure to the cross member that the tine member 18 and the tines 22A and and 22B have penetrated the earth. The preferred configuration of the implement allow for efficient penetration of the soil.

FIG. 4C will be referred to next. With the distal segment of the pole 32 being angled away from the user, once the user has driven the implement into the earth, the foot of the user can be removed from the foot receiver 24 and the user pulls the handle portion 14 toward the user's body thus causing the tines to move the soil and causing the lever arm 38 to contact the surface of the earth. As the user first pulls on the handle portion 14, the first segment 56 (see FIG. 3) of the lever arm 38 contacts the surface of the earth. As the user continues to pull on the handle portion 14, the second segment 58 of the lever arm 38 makes contact with the surface of the earth and causes the implement to lift the soil further from its original position thus allowing the user to readily loosen or move even compacted soil. The embodiment of the present invention provide such ease of use that the exertion which must be exerted by the user when working well cultivated soils is minimal. In particular, the present invention allows the turning and moving of soil without undue strain on the lower back of the user since lifting action by the user is avoided (which would be required if not for the present invention). The potentially hazardous lifting action is replaced with motions of pulling toward the torso of the user and pushing down on the implement using the arms and torso of the user in accordance with the present invention.

Figure 5A:
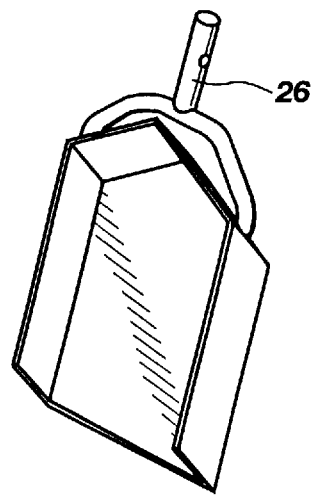
FIGS. 5A and 5B are perspective view of alternate preferred implement heads for the present invention.
Figure 5B:
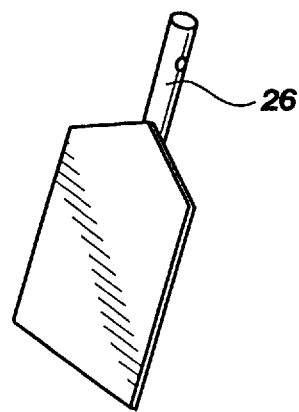

FIG. 5A provides a perspective view of another preferred implement head which is particularly adapted to create trenches. The implement head represented in FIG. 5A is interchangeable with the head portion 10 illustrated in FIGS. 1–3. FIG. 5B provides a perspective view of another preferred implement head which is particularly adapted for moving blocks of soil.

In view of the forgoing, it will be appreciated that the present invention provides a garden implement which makes turning and loosening of soil easy for a user and which readily allows a user to loosen and/or turn compacted soil. The present invention also provides an implement which allows a user to move compacted earth without excessive physical exertion and in particular without lower back strain.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An implement for manually moving earth by a user having a hand and a foot, said implement comprising:

head means for penetrating the earth and for providing a surface by which earth can be pushed, the head means having a first side and a second side and an upper end and a lower end, the lower end adapted for penetrating the earth;

handle means for providing a location for the user to grasp the implement by hand;

shaft means for rigidly connecting the head means to the handle means;

receiver means for receiving the foot of the user, the receiver means oriented such that as the user pushes downwardly with the foot the head means penetrates the earth;

lever means, extending from the second side of the head means, for extending a fulcrum point for the head means away from the second side of the head means, the lever means fixedly attached at a fixed first lever angle in the range from about 0° to about 50° in relation to a line extending from the second side of the head means and perpendicular to the plane of the head means in the direction of the lower end of the head means such that after the head means has penetrated the earth and the user applies force to the handle means in the direction of the second side of the implement head, the lever means contacts the surface of the earth and causes the head means to move earth.

2. An implement as defined in claim 1 wherein the shaft means comprises:

a proximal segment adjacent to the head means, the proximal segment oriented substantially in the plane defined by the head means; and a distal segment spaced from the head means, the distal segment oriented at a shaft angle in relation to the plane formed by the proximal segment, the angle directed toward the first side of the head means.

3. An implement as defined in claim 2 wherein the shaft angle is in the range from about 5° to about 45°.

4. An implement as defined in claim 1 wherein the lever means comprises a first segment, located adjacent to the head means, oriented at the first lever angle and a second segment, located away from the head means, and oriented at a second lever angle, the second lever angle being different than the first angle and the second segment being directed toward the upper end of the head means.

5. An implement as defined in claim 4 wherein the first lever angle is in the range from about 5° to about 50° in relation to a line extending from the second side of the head means and perpendicular to the plane of the head means and wherein the second lever angle is in the range from about 5° to about 50° in relation to said line.

6. An implement as defined in claim 1 further comprising means for releasably securing the head means to the shaft means.

7. An implement as defined in claim 1 wherein the head means comprises a plurality of tines, each of said tines comprising a pointed tip at a lower end thereof.

8. An implement as defined in claim 7 wherein the lower end of each tine is oriented at an angle toward the front side of the head means.

9. An implement as defined in claim 1 wherein the receiver means comprises means for surrounding the foot of the user.

10. An implement as defined in claim 9 wherein the means for surrounding the foot comprises a rigid material, the rigid material forming a polygonal shape.

11. An implement as defined in claim 1 wherein the shaft means comprises a tubular shaft a nd wherein the handle means comprises a member connected to the tubular shaft and oriented perpendicularly thereto.

12. A garden implement for turning and loosening soil by a user having a hand and a foot, the implement comprising:

an implement head configured for penetrating the earth and for providing a surface by which earth can be pushed, the implement head having a first side and a second side and an upper end and a lower end, the lower end adapted for penetrating the earth;

a shaft extending upwardly from the implement head, the shaft including a proximal segment adjacent to the implement head, the proximal segment oriented substantially in the plane defined by the implement head, and a distal segment spaced from the implement head, the distal segment oriented at an angle in relation to the plane formed by the proximal segment, the angle directed toward the first side of the implement head;

a foot receiver adapted for receiving the foot of the user, the foot receiver oriented such that as the user pushes downwardly with the foot the implement head penetrates the surface of the earth;

lever means, extending from the second side of the head means, for extending a fulcrum point for the head means away from the second side of the head means, the lever means fixedly attached to the second side of the head means at a fixed first lever angle which is in the range from about 0° to about 5°0 in relation to a line extending from the second side of the implement head and perpendicular to the plane of the implement head in the direction of the lower end of the head means such that after the head means has penetrated the earth and the user applies force to the shaft in the direction of the second side of the implement head, the lever means contacts the surface of the earth and causes the head means to move earth.

13. A garden implement as defined in claim 12 wherein the lever means comprises a first segment, located adjacent to the implement head, fixedly attached at the first lever angle and a second segment, located away from the implement head, and oriented at a second lever angle, the second lever angle being different than the first lever angle and the second segment being directed toward the upper end of the implement head.

14. A garden implement as defined in claim 13 wherein the first lever angle is in the range from about 5° to about 50° in relation to a line extending from the second side of the implement head and perpendicular to the plane of the head means and wherein the second lever angle is in the range from about 5° to about 50° in relation to said line.

15. A garden implement as defined in claim 12 further comprising means for releasably securing the implement head to the shaft.

16. A garden implement as defined in claim 12 wherein the implement head comprises a plurality of tines, each of said tines comprising a pointed tip at a lower end thereof.

17. A garden implement as defined in claim 16 wherein the lower end of each tine is oriented at an angle toward the front side of the implement head.

18. A garden implement as defined in claim 12 wherein the foot receiver comprises means for surrounding the foot of the user.

19. A garden implement as defined in claim 12 further comprising a handle.

* * * * *